(12) United States Patent
Iyer et al.

(10) Patent No.: US 11,030,815 B2
(45) Date of Patent: Jun. 8, 2021

(54) METHOD AND SYSTEM FOR RENDERING VIRTUAL REALITY CONTENT

(71) Applicant: Wipro Limited, Bangalore (IN)

(72) Inventors: Manjunath Ramachandra Iyer, Bangalore (IN); Sethuraman Ulaganathan, Tiruchirapalli (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/659,710

(22) Filed: Oct. 22, 2019

(65) Prior Publication Data

US 2021/0074064 A1 Mar. 11, 2021

(30) Foreign Application Priority Data

Sep. 5, 2019 (IN) .............................. 201941035833

(51) Int. Cl.
| | |
|---|---|
| *G06T 19/00* | (2011.01) |
| *G06K 9/00* | (2006.01) |
| *G06F 3/01* | (2006.01) |
| *G06T 19/20* | (2011.01) |
| *G06F 3/0481* | (2013.01) |
| *G02B 27/01* | (2006.01) |

(52) U.S. Cl.
CPC .......... *G06T 19/006* (2013.01); *G02B 27/017* (2013.01); *G06F 3/011* (2013.01); *G06F 3/017* (2013.01); *G06F 3/04815* (2013.01); *G06K 9/00671* (2013.01); *G06T 19/20* (2013.01)

(58) Field of Classification Search
None
See application file for complete search history.

(56) References Cited

U.S. PATENT DOCUMENTS 9,696,547 B2 7/2017 Kinnebrew et al.
10,019,962 B2 7/2018 Liu et al.

FOREIGN PATENT DOCUMENTS

AU 2012348348 B2 6/2013

*Primary Examiner* — Vu Nguyen
(74) *Attorney, Agent, or Firm* — Finnegan, Henderson, Farabow, Garrett & Dunner, LLP

(57) ABSTRACT

The invention relates generally to Virtual Reality (VR) and more particularly to method and system for rendering VR content. The method includes identifying user interaction with at least one object within a VR environment. The method further includes training a deep learning feature extraction model to identify predetermined and undetermined interactions in the VR environment. The deep learning feature extraction model is trained based on a plurality of scene images and associated applied templates that are provided to the deep learning feature extraction model. Each of the applied templates identifies at least one spurious object and at least one object of interest in an associated scene image. The method includes classifying the user interaction as one of a predetermined interaction and an undetermined interaction based on the deep learning feature extraction model. The method further includes rendering a VR content in response to the user interaction being classified.

20 Claims, 11 Drawing Sheets

| Time Stamp | Applied Templates Provided | Object of Interest | Spurious Object | Attribute of Spurious Object |
|---|---|---|---|---|
| 10 Seconds | Mixerside.bmp Mixerfront.bmp Sound_4.mp3Text | Mixer.1.bmp | S1.bmp | Vegetables |

FIG. 6

METHOD AND SYSTEM FOR RENDERING VIRTUAL REALITY CONTENT

This application claims the benefit of Indian Patent Application Serial No. 201941035833 filed Sep. 5, 2019, which is hereby incorporated by reference in its entirety.

FIELD

This disclosure relates generally to Virtual Reality (VR) and more particularly to method and system for rendering VR content.

BACKGROUND

Virtual reality (VR) contents rendered in a VR system may include content, such as, gestures, actions, language, or graphics, etc., to be viewed by a user. Generally, the contents of the VR system include predetermined data which may be pre-stored in a data repository. The predetermined data may include contents that may be represented to a user in the form of a workflow. Particularly, the predetermined data that includes VR contents may correspond to predetermined interactions of one or more users. Thus, in response to one or more user interactions or attributes, the VR system may render the VR contents. The VR contents may only be rendered in response to one or more predetermined interactions that correspond to the pre-stored data in the data repository. Thus, the VR system may include pre-stored contextual content that may vary with respect to different viewpoints associated with users. However, the VR system may render the same predetermined content for all users, irrespective of the corresponding viewpoint.

One of the conventional VR systems may obtain data from a multitude of data acquisition modules and controllably melds this information in the form of predetermined data into a data repository that represents all the information of interest relating to a VR environment. One or more processing units of the conventional VR system may respond to user inputs/interactions by rendering contextual contents including one or more visualization characteristics from pre-stored data associated with each individual user. The conventional VR system presents content from the pre-stored data associated with objects, views, and phenomena that correspond to one or more predetermined interactions.

However, the conventional VR system does not describe any mechanism that may alter VR contents, predetermined data, or workflow contained therein, in response to one or more user interactions that may be undetermined. Further, the conventional VR system lacks in any mechanism, which is configured to facilitate real-time change of the workflow and/or contents within the conventional VR system, in response to user interactions and queries, in order to provide seamless realistic experience to a user.

Thus, the conventional VR systems do not provide any mechanism which may dynamically render content in response to one or more user interactions, when the one or more user interactions do not form a part of predetermined data of the conventional VR systems. Also, the conventional VR systems do not include a mechanism, which is dynamically responsive to user interactions, monitors one or more user interactions, and provides alert signal or assistance, when a user interaction is irrelevant or a step in the workflow is performed inaccurately by the user.

SUMMARY

In one embodiment, a method of rendering Virtual Reality (VR) content is disclosed. The method may include identifying user interaction with at least one object within a VR environment. The method may further include training a deep learning feature extraction model to identify predetermined and undetermined interactions in the VR environment. The deep learning feature extraction model is trained based on a plurality of scene images and associated applied templates that are provided to the deep learning feature extraction model. Each of the applied templates identifies at least one spurious object and at least one object of interest in an associated scene image from the plurality of scene images. The method may further include classifying the user interaction as one of a predetermined interaction and an undetermined interaction based on the deep learning feature extraction model. The method may further include rendering a VR content in response to the user interaction being classified as one of the predetermined interaction and the undetermined interaction.

In another embodiment, a rendering device for generating VR content is disclosed. The rendering device includes a processor and a memory communicatively coupled to the processor, wherein the memory stores processor instructions, which, on execution, causes the processor to identify user interaction with at least one object within a VR environment. The processor instructions further cause the processor to train a deep learning feature extraction model to identify predetermined and undetermined interactions in the VR environment. The deep learning feature extraction model is trained based on a plurality of scene images and associated applied templates that are provided to the deep learning feature extraction model. Each of the applied templates identifies at least one spurious object and at least one object of interest in an associated scene image from the plurality of scene images. The processor instructions further cause the processor to classify the user interaction as one of a predetermined interaction and an undetermined interaction based on the deep learning feature extraction model. The processor instructions further cause the processor to render a VR content in response to the user interaction being classified as one of the predetermined interaction and the undetermined interaction.

In yet another embodiment, a non-transitory computer-readable storage medium is disclosed. The non-transitory computer-readable storage medium has instructions stored thereon, a set of computer-executable instructions causing a computer that includes one or more processors to perform steps of identifying a user interaction with at least one object within a VR environment; training a deep learning feature extraction model to identify predetermined and undetermined interactions in the VR environment, wherein the deep learning feature extraction model is trained based on a plurality of scene images and associated applied templates that are provided to the deep learning feature extraction model, wherein each of the applied templates identifies at least one spurious object and at least one object of interest in an associated scene image from the plurality of scene images; classifying the user interaction as one of a predetermined interaction and an undetermined interaction based on the deep learning feature extraction model; and rendering a VR content in response to the user interaction being classified as one of the predetermined interaction and the undetermined interaction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 illustrates an object table that includes details associated with object of interest and spurious objects detected by a deep learning feature extraction module, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
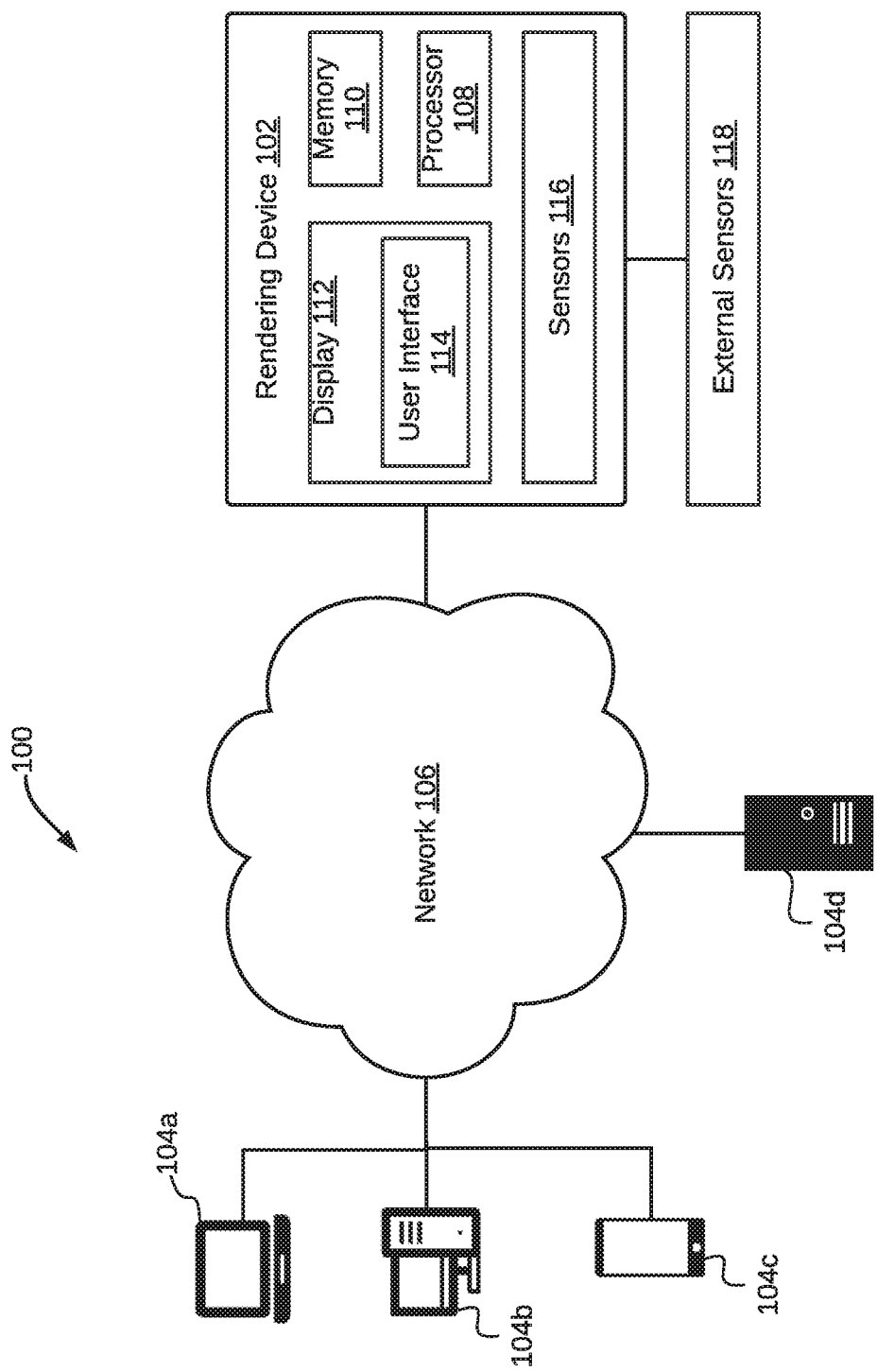
FIG. 1 is a block diagram illustrating a system for rendering Virtual Reality (VR) content, in accordance with an embodiment.

Referring now to FIG. 1, a block diagram of an exemplary system 100 for rendering Virtual Reality (VR) content is illustrated, in accordance with an embodiment. The system 100 may include a rendering device 102 that may be configured to render VR content to a user. The VR content may be rendered within a VR environment, which may be presented or rendered to the user through the rendering device 102. By way of an example, the VR content may be overlaid over the VR environment. Examples of the rendering device 102 may include, but are not limited to, a laptop, a holographic projector, a smart television, a desktop, a smart phone, a head-mounted display, a VR gear, or a tablet. The VR content, for example, may include, but is not limited to an animal, an object, a person, furniture, a scene background, utensils, or a whiteboard. The VR content may also be a Three Dimensional (3D) interactive object.

The rendering device 102 dynamically renders VR content in response to user interactions with one or more objects within the VR environment. User interactions may include, but are not limited to user actions or attributes determined through multiple modalities, such as cameras (for gestures, expressions, or movements), microphone, or haptic gloves (touch sensors). The user interactions may also include any type of user intervention.

The user interactions may further include predetermined interactions and undetermined interactions. The predetermined interactions may be those user interactions that are anticipated or included in one or more workflows associated with various scenes within the VR environment. A workflow associated with a scene includes a sequence of states. Each state in the sequence of states further includes a predetermined interaction and an associated predetermined response. Whereas, the undetermined interactions are not anticipated or included in one or more workflows associated with various scenes within the VR environment. In other words, undetermined interactions may include those user interactions for which the one or more workflows do not include an associated predetermined response.

The VR content may be stored on and provided through one or more of a plurality of computing devices 104 (for example, a laptop 104a, a desktop 104b, and a smart phone 104c) to the rendering device 102. In an embodiment, one or more users may provide the VR content through the plurality of computing devices 104. Other examples of the plurality of computing devices 104 may include, but are not limited to a server 104d (for example, an application server), which may also store VR content that may be provided to the rendering device 102. The plurality of computing device 104 may be communicatively coupled to the rendering device 102 via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

In order to render VR content to a user, the rendering device 102 may include a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

The memory 110 may further include various modules that enable the rendering device 102 to render VR content. These modules are explained in detail in conjunction with FIG. 2. The rendering device 102 may further include a display 112 having a User Interface (UI) 114 that may be used by a user to provide inputs to the rendering device 102. The rendering device 102 may also include sensors 116. Examples of the sensors 116 may include, but are not limited to an accelerometer, a compass, a gyroscope, a pressure sensor, a heat sensor, a proximity sensor, or a camera. The processor 108, by way of the sensors 116, may be configured to detect user interactions with one or more objects within the VR environment. In an embodiment, the rendering device 102 may be coupled (through wireless or wired means) to external sensors 118. The processor 108, by way of the external sensors 118, may be configured to detect user interactions made using the external sensors 118. Examples of the external sensors 118 may include, but are not limited to microphones, haptic gloves (touch sensors), controllers, or joysticks.

Figure 2:
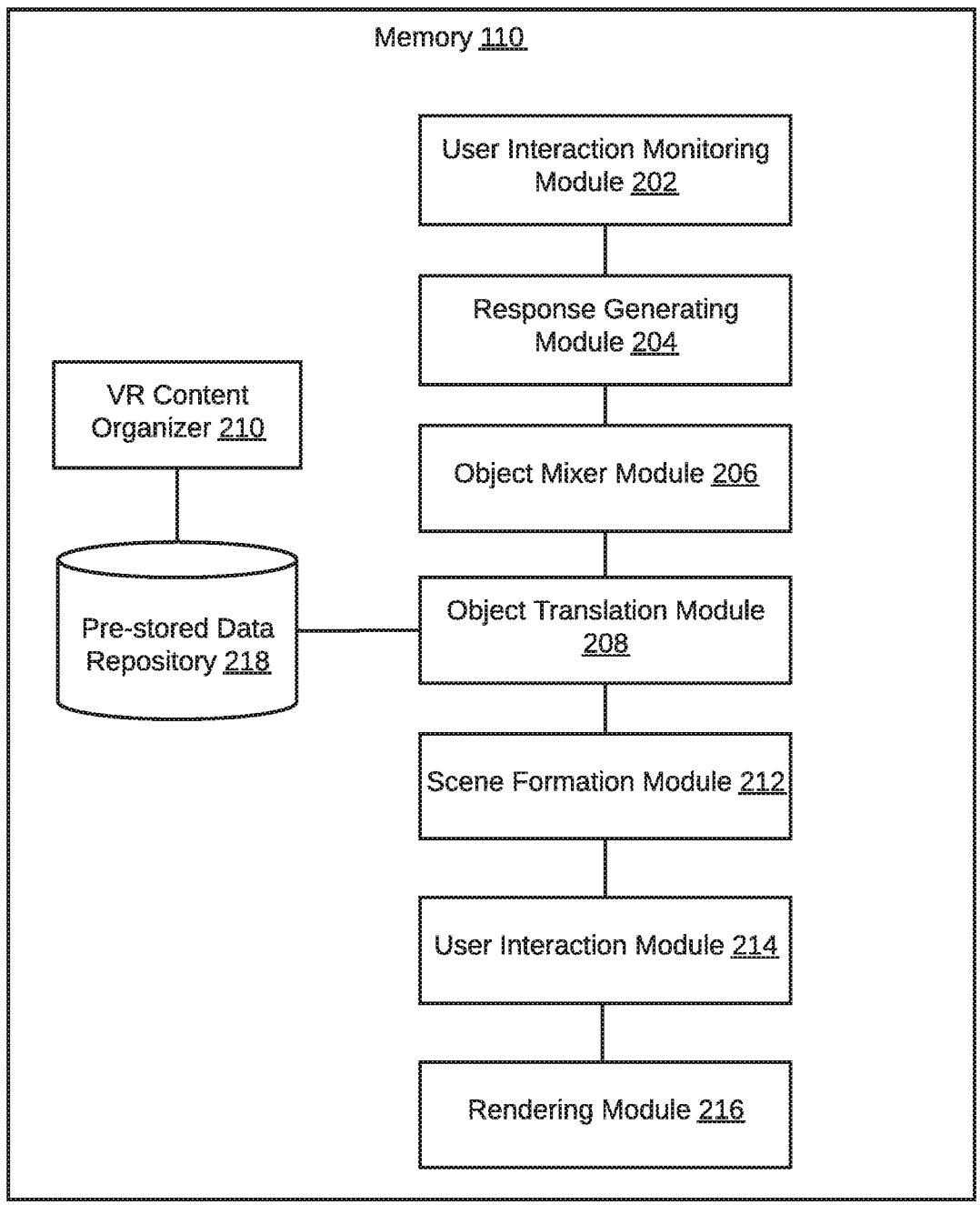
FIG. 2 is a block diagram illustrating various modules within a memory of a rendering device configured to render VR content, in accordance with an embodiment.

Referring now to FIG. 2, a block diagram of various modules within the memory 110 of the rendering device 102 configured to generate VR content is illustrated, in accordance with an embodiment. The memory 110 includes a user interaction monitoring module 202, a response generating module 204, an object mixer module 206, an object translation module 208, a VR content organizer 210, a scene formation module 212, a user interaction module 214, a rendering module 216, and a pre-stored data repository 218. In an embodiment, one or more of these modules may reside within the server 104d.

The user interaction monitoring module 202 may be configured to monitor one or more user interactions. The user interactions may further include predetermined interactions and undetermined interactions. The predetermined interactions may be those user interactions that are anticipated or included in one or more workflows associated with various scenes within the VR environment. A workflow associated with a scene includes a sequence of states. Each state in the sequence of states further includes a predetermined interaction and an associated predetermined response. In contrast, the undetermined interactions are not anticipated or included in one or more workflows associated with various scenes within the VR environment. In other words, undetermined interactions may include those user interactions for which the one or more workflows do not include an associated predetermined response. For each state in the sequence of states of a workflow, mapping of the predetermined interaction and the associated predetermined responses may be stored in the pre-stored data repository 218.

The response generating module 204 may be configured to address or provide a response for one or more user interactions by way of a plurality of agents, which may include real/physical agents and/or virtual agents. The real/physical agents may include a human expert. More particularly, based on a type of the user interaction, the response generating module 204 may be configured to provide a response to the user. As discussed before, the response may be provided either through a virtual agent and/or a real agent. This is further explained in detail in conjunction with FIG. 3.

The object mixer module 206 may address the one or more user interactions by performing one or more actions through one or more real and virtual agents in a sequence, such that, for a given workflow these actions alter the course of the sequence of states within the workflow. In other words, the object mixer module 206 may perform actions in response to undetermined interactions. By way of an example, when one or more users while operating a device in a VR environment perform one or more steps or interactions that are not relevant for functioning of the device, the object mixer module 206 may enable a real agent to provide response to redirect the one or more users to correct or to provide accurate steps for the functioning of the rendering device 102.

The object translation module 208 may be configured to identify responding agents, when the user performs one or more user interactions that are undetermined. When a response to a user interaction is not available in the pre-stored data repository 218, a corresponding real agent is invoked to provide the response in real time. As discussed before, the pre-stored data repository 218 may include mapping of the predetermined interaction and the associated predetermined response. In an embodiment, when there is no response available for a user query in the pre-stored data repository 218, the user query is routed to a human expert. The human expert may then provide the answer or response to the query either through his avatar in the VR environment or through a virtual agent that was supposed to provide the answer or response to the user query.

By way of an example, a user may ask one or more queries related to a VR content from a virtual agent and the answer to the one or more queries may not be available in the pre-stored data repository 218. In other words, the one or more queries may be undetermined interactions. In such a case, a real agent may be invoked to provide a response, which may be delivered through the virtual agent. As a result, the complete process would be transparent to an end user. The one or more queries and the response provided by the real agent are then added as a state into the associated workflow. Additionally, the mapping between the one or more queries and the response is stored in the pre-stored data repository 218. Thus, the pre-stored data repository 218 may be configured to be automatically scaled-up with contents delivered by the real agent, in response to undetermined interactions.

The VR content organizer 210 may be configured to organize VR contents in the pre-stored data repository 218 in predetermined patterns to enable interventions by one or more real and virtual agents. As discussed before, the patterns in the pre-stored data repository 218 may include mapping of predetermined interactions and the associated predetermined response. In an embodiment, the pre-stored data repository 218 may be placed over cloud (for example, in the server 104d) in order to readily provide access to multiple agents and users. In other words, the pre-stored data repository 218 may be configured to support easy and speedy access to deliver one or more responses corresponding to the user interactions in real time.

Once a response to a user interaction, which may be predetermined or undetermined, has been determined, the scene formation module 212 may be configured to render a VR content to the user. As discussed above, the VR content may be partly predetermined and partly generated adaptively by a real agent.

The user interaction module 214 is configured to selectively adapt the sequence of states derived based on the user interactions in order to provide responses to the user interactions through one or more real and virtual agents. As discussed before, each state in the sequence of states includes a predetermined interaction and an associated predetermined response. Such mapping is stored in the pre-stored data repository 218. Also, in addition to the predetermined interactions, the user interactions may include undetermined interactions. The undetermined interactions are not anticipated or included in one or more workflows associated with various scenes within the VR environment. Thus, when the user interaction is undetermined, the pre-stored data repository 218 may not include a corresponding response to this interaction. In this case, the user interaction module 214 may route the user interaction to a real agent (who may be a human expert). The real agent may generate a response to the undetermined interaction. By way of an example, in such a scenario, voice of the real agent may be transformed into voice of a virtual agent in the VR environment.

The rendering module 216 may render VR contents in response to one or more user interactions to the user. The rendering device 102 may be configured to control the display of the VR contents rendered by the rendering module

216 to one or more users. Particularly, the rendering device 102 may format the VR content in order to render it on the display 112. The formatted VR content may be automatically transmitted for rendering, in response to the user interaction.

Figure 3:
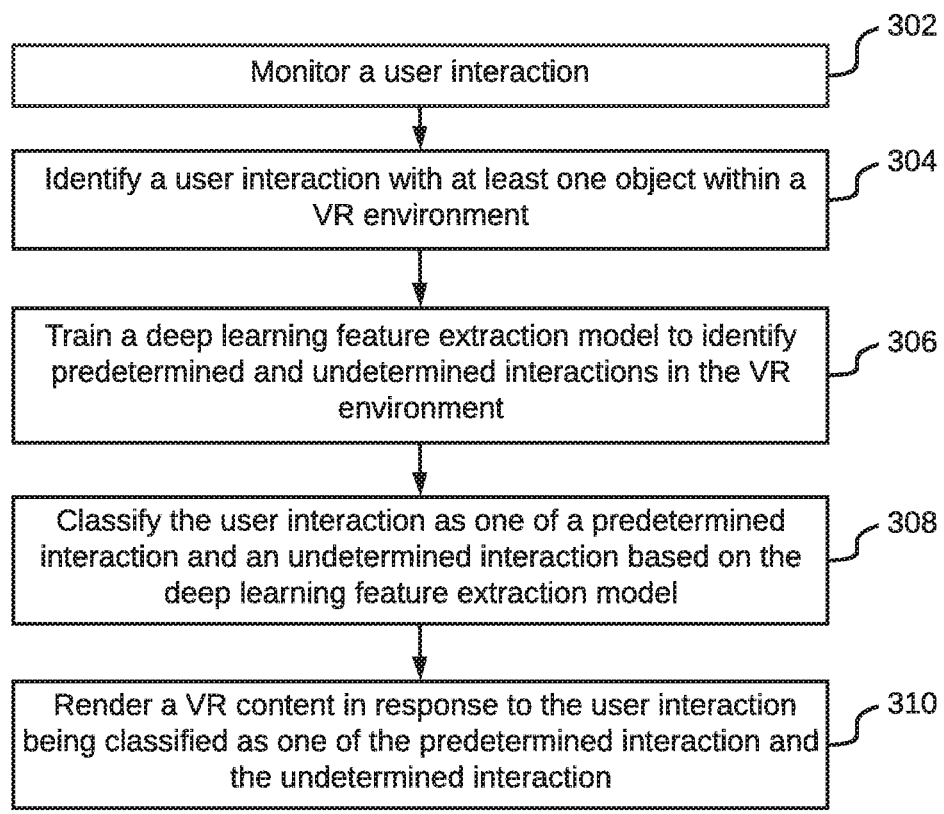
FIG. 3 illustrates a flowchart of a method for rendering VR content within a VR environment, in accordance with an embodiment.

Referring now to FIG. 3, a flowchart of a method for rendering VR content within a VR environment is illustrated, in accordance with an embodiment. At step 302, the rendering device 102 may monitor one or more user interactions. The rendering device 102 may monitor the one or more user interactions through a plurality of modalities, which may include, but are not limited to camera (for gestures, expressions, or movements), a microphone, or haptic gloves (which may use touch sensors). The plurality of modalities, for example, may be the sensors 116 and the external sensors 118.

At step 304, the rendering device 102 may identify a user interaction with one or more objects within the VR environment. The user interactions may include predetermined interaction and undetermined interactions. The predetermined interactions may be those user interactions that are anticipated or included in one or more workflows associated with various scenes within the VR environment. As discussed before, each workflow includes a sequence of states and each state further includes mapping of a predetermined interaction with a predetermined response. The mapping for each state is stored in the pre-stored data repository 218. Thus, for the predetermined interactions, a predetermined response may be derived from the pre-stored data repository 218. However, the undetermined interactions are not anticipated or included in one or more workflows associated with various scenes within the VR environment. In other words, the undetermined interactions may include those user interactions for which the one or more workflows do not include an associated predetermined response. Thus, for the undetermined interactions, a predetermined response may not be available in the pre-stored data repository 218.

By way of an example, in a mixer grinder that may be depicted in a VR environment, a user may stop the running mixer grinder to open ajar (first interaction) and put some salt into ajar of the mixer grinder (second interaction). These user interactions are expected and are thus predetermined interactions. For each of the predetermined interactions, the rendering device 102 may include a predetermined response. However, precise timings of these predetermined interactions and durations may not be known. On the other hand, when a user slips the jar from his hands, such a user interaction, is unexpected and thus is an undetermined interaction. The rendering device 102 may not include a predetermined response for such a user interaction.

At step 306, the rendering device 102 trains a deep learning feature extraction model to identify predetermined and undetermined interactions in the VR environment. The deep learning feature extraction model may be trained based on a plurality of scene images and associated applied templates that are provided to the deep learning feature extraction model. An applied template identifies one or more spurious object and one or more objects of interest in an associated scene image. In other words, using an applied templated, the deep learning feature extraction model may be trained to identify objects of interests and ignore spurious objects. This is further explained in detail in conjunction with FIG. 5 and FIG. 6. The deep learning feature extraction model may be a Convoluted Neural Network (CNN) or an auto-encoder based feature extraction model. An auto-encoder may take raw data as input and may try to generate clean version of the data as the output. In this process, the auto-encoder may reduce the noise associated with the raw data. The auto-encoder may include data encoder followed by a data decoder. The output of encoder provides required features within the raw data.

Based on the deep learning feature extraction model, the rendering device 102, at step 308, classifies the user interaction as one of a predetermined interaction and an undetermined interaction. In continuation of the example given above, when a user slips the jar from his hands, such a user interaction, is unexpected and thus is classified as an undetermined interaction. The classification of the user interaction is further explained in detail in conjunction with FIG. 7.

At step 310, the rendering device 102 renders a VR content in response to the user interaction being classified as one of the predetermined interaction and the undetermined interaction. This is further explained in detail in conjunction with FIG. 9. In continuation of the example given above, since the user interaction of the jar slipping from the user's hands is classified as an undetermined interaction, an adaptive response is generated and a chef (who also interacts with the jar most of the time in the scene) is rendered within the scene. The chef is further rendered as holding and re-installing the jar in order to start the mixer grinder again. This adaptive response is then stored in the pre-stored data repository 218 as a predetermined response associated with the user interaction of dropping the jar. As a result, if subsequently any user performs the user interaction of dropping the jar, the chef is rendered as holding and re-installing the jar in order to start the mixer grinder again.

Figure 4:
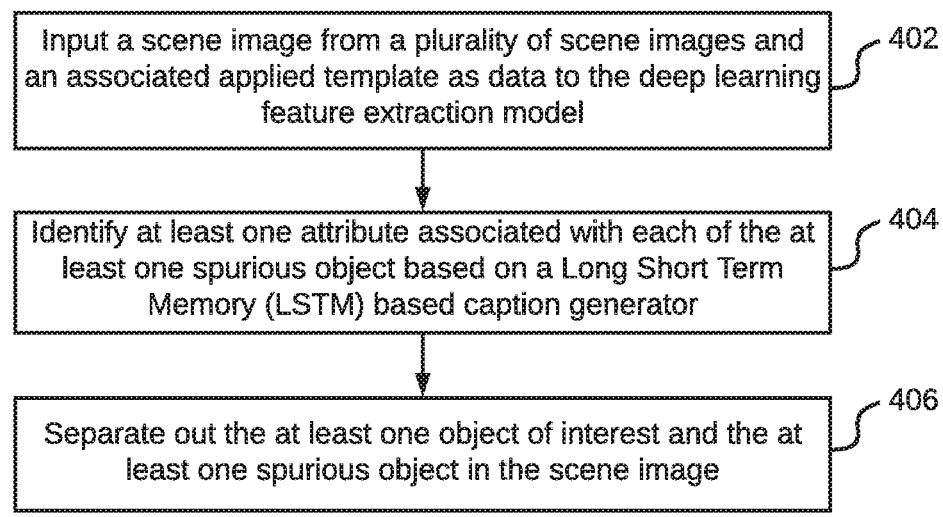
FIG. 4 illustrates a flowchart of a method for training a deep learning feature extraction model to identify predetermined and undetermined interactions, in accordance with an embodiment.

Referring now to FIG. 4, a flowchart of a method for training a deep learning feature extraction model to detect and separate one or more spurious objects and one or more objects of interest from a plurality of scenes is illustrated, in accordance with an embodiment. At step 402, inputs may be provided to the deep learning feature extraction model. The inputs may include a scene image from a plurality of scene images. By way of an example, the scene may include different postures and context of objects. The inputs may also include an applied template associated with the scene image. Each applied template identifies one or more spurious objects and one or more objects of interest in the scene image from the plurality of scene images. The applied template may include one or more of, but is not limited to audio, video, or text.

At step 404, one or more attributes of the one or more spurious objects are identified based on a Long Short Term Memory (LSTM) based caption generator. To this end, an output of the penultimate layer of the deep learning feature extraction model (for example, CNN) may be used as input to the LSTM based caption generator. Based on the identified one or more attributes associated with the one or more spurious objects, the deep learning feature extraction model, at step 406, may separate the one or more objects of interest and the one or more spurious objects from the scene image. In an embodiment, objects in a scene may be separated based on variations in intensities at the edges of such objects. After being trained, the deep learning feature extraction model may detect contextually added objects in real time. Thus, the deep learning feature extraction model may learn to identify one or more objects based on an applied template and to separate out the one or more objects from the associated scene image fed as an input to the deep learning features extraction model. The remaining objects in the scene may be identified as one or more spurious objects.

Figure 5:
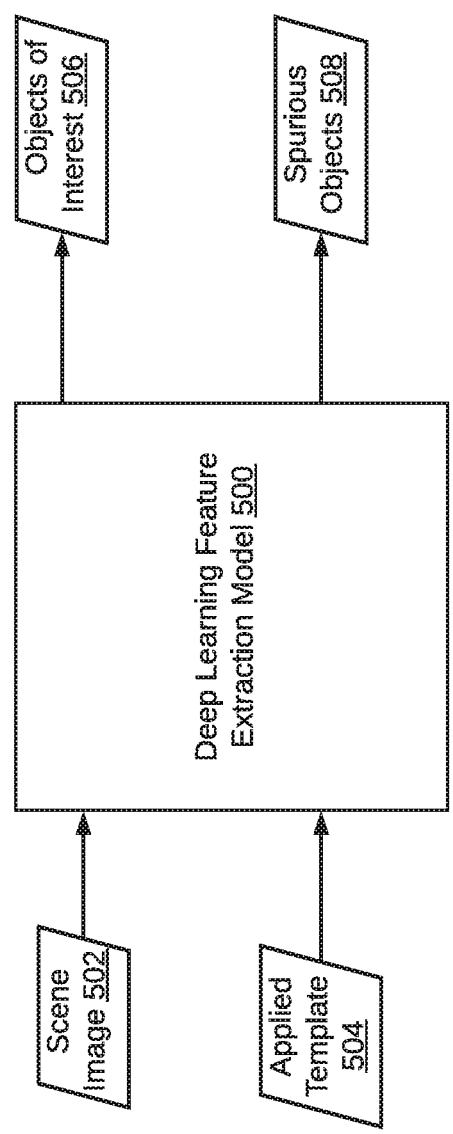
FIG. 5 illustrates training of a deep learning feature extraction model to detect one or more spurious objects and one or more objects of interest, in accordance with an exemplary embodiment.

Referring now to FIG. 5, training of a deep learning feature extraction model 500 to detect one or more spurious objects 508 and one or more objects of interest 506 is illustrated, in accordance with an exemplary embodiment. An input 502 and an input 504 are provided to the deep learning feature extraction model 500. The input 502 may be a scene image. By way of an example, the scene image may include different postures and context of objects. The input 504 may include an applied template associated with the scene image provided as an input at 502. The applied template identifies one or more spurious objects 508 and one or more objects of interest 506 in the scene image.

By way of an example, in a VR demonstration of a mixer grinder product by a virtual sales agent, the mixer grinder in a specific posture (for example frontal), may be an object of interest within the applied template provided at 504. Similarly, fruits stuffed in ajar of the mixed grinder for the purpose of grinding may form spurious objects. While extracting the objects from the scene, the deep learning feature extraction model 500 may separate the mixer from the fruits loaded therein.

Thus, based on the inputs 502 and 504, the deep learning feature extraction model 500, at 506, identifies object of interest 506 from the scene image provided at 502. At 508, the deep learning feature extraction model 500 identifies spurious objects 508 from the scene image. In continuation of the example above, the deep learning feature extraction model 500 learns to identify mixer object based on the applied template provided at 504 and separates out the mixer object from a scene image provided at 502. Thus, the deep learning feature extraction model 500 identifies the mixer object as an object of interest at 506 and rest of the associated objects, for example, fruits, as spurious objects at 508.

At different points in the flow of a VR content, applied templates supplied may be different and may match with objects in a scene that is known in advance. Thus, it helps to determine spurious objects from a scene image based on the deep learning feature extraction model 500. In an embodiment, a table may be generated and stored within the memory 110 of the rendering device 102, such that, the table include details associated with a time stamp associated with the scene image, name of an applied template provided for that time stamp, objects of interest extracted from the scene image at the given time stamp, spurious objects 508 and objects of interest 506 extracted from the scene image at the given time stamp, and attributes associated with the spurious objects 508.

An exemplary table 600 is depicted in FIG. 6. A column 602 of the table 600 includes time stamps for a scene image, a column 604 includes names of applied templates provided at various time stamps, a column 606 incudes details of objects of interest 506 extracted from a scene image at a given time stamp, a column 608 includes details of spurious objects 508 extracted from a scene image at a given time stamp, and a column 610 includes attributes associated with the spurious objects 508 extracted for a scene image at a given time stamp. It will be apparent to a person skilled in the art that time stamp may be replaced with frame number.

By way of an example, the column 602 includes "10 seconds" as the time stamp for a scene image, the column 604 includes name of the applied templates, i.e., mixerside, mixerfront, and sound_4, the column 606 includes details of an image of the mixer (object of interest), the column 608 includes details of an image of a spurious object S1, and the column 610 includes "vegetables" as the attributes for the spurious object S1.

Figure 7:
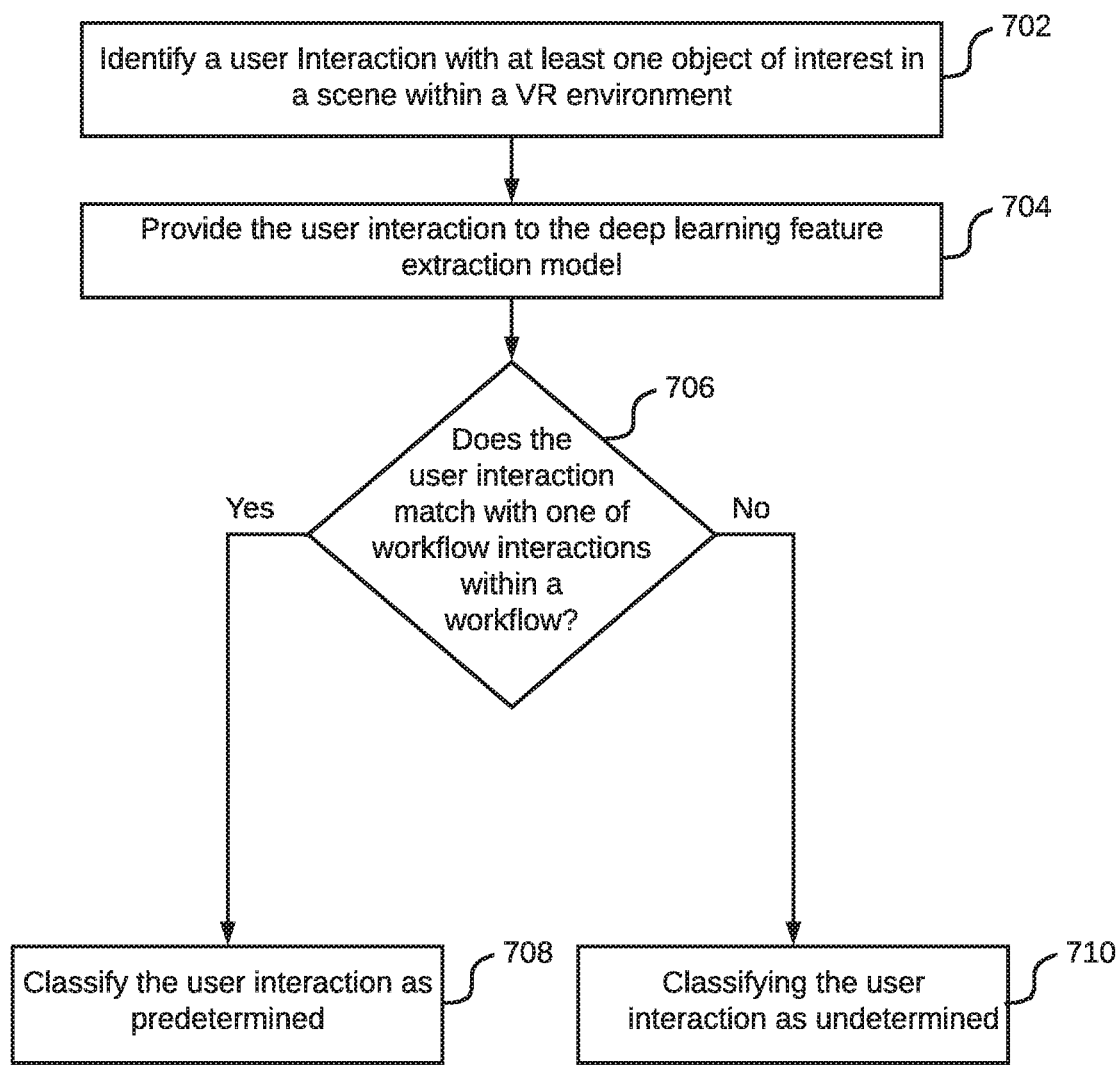
FIG. 7 illustrates a flowchart of a method for classifying a user interaction, in accordance with an embodiment.

Referring now to FIG. 7, a flowchart of a method for classifying a user interaction is illustrated, in accordance with an embodiment. At step 702, the rendering device 102 identifies a user interaction with one or more objects of interest in a scene within a VR environment. At step 704, the user interaction may be provided to the deep learning feature extraction model. At step 706, a check is performed to determine whether the user interaction matches with one of workflow interactions within a workflow associated with the scene. As discussed before, a workflow associated with a scene includes a sequence of states and each such state includes a predetermined interaction mapped to a predetermined response. Thus, a workflow may include multiple such user interactions.

When the user interaction matches with one of the workflow interactions within a workflow associated with the scene, the deep learning feature extraction model, at step 708, classifies the user interaction as predetermined. In other words, when the user interaction matches with one of the predetermined interactions within one of the sequence of states, the user interaction is classified as predetermined interaction.

Referring back to step 706, when the user interaction does not match with one of the workflow interactions within a workflow associated with the scene, the deep learning feature extraction model, at step 710, classifies the user interaction as undetermined interaction.

Figure 8:
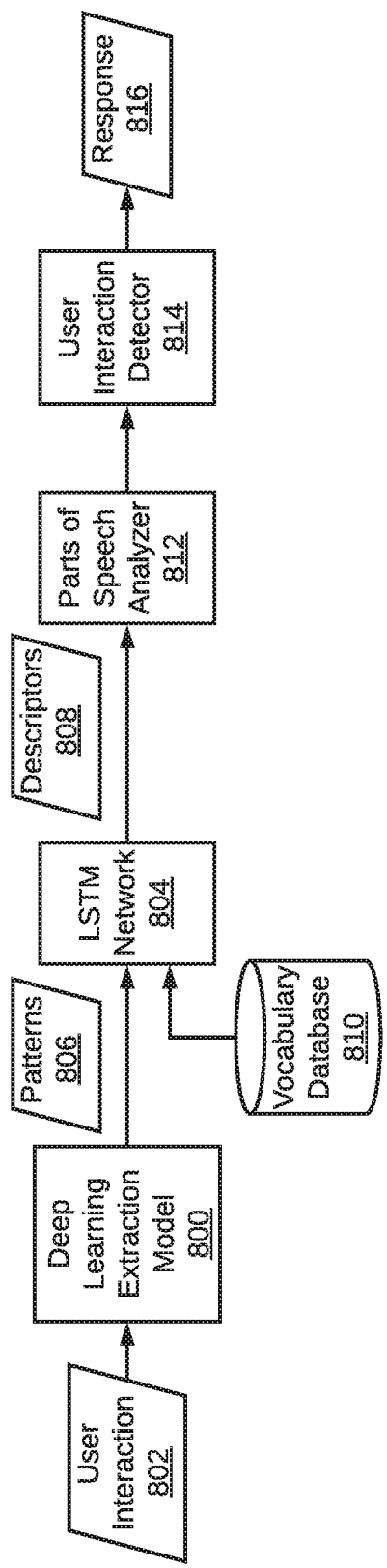
FIG. 8 illustrates classification of a user interaction as predetermined or undetermined through a deep learning feature extraction model and subsequent generation of a response to the user interaction, in accordance with an exemplary embodiment.

Referring now to FIG. 8, classification of a user interaction as predetermined or undetermined through a deep learning feature extraction model 800 and subsequent generation of a response to the user interactions is illustrated, in accordance with an exemplary embodiment. A user interaction 802 with one or more objects of interest within a scene may be fed into the deep learning feature extraction model 800. The user interaction, for example, may be an action performed by a virtual agent within a VR environment. As discussed before in FIG. 4 and FIG. 5, the deep learning feature extraction model 800 is trained to identify predetermined and undetermined interactions.

An output of a penultimate layer of the deep learning extraction model 800 (for example, CNN) may be used as input to an LSTM network 804. The output for example may be patterns 806 that are taken as an input by the LSTM network 804. The LSTM network 804 uses the pattern 806 to generate descriptors 808 (or captions), which are textual description of user interactions with one or more objects of interest in a VR environment. Moreover, the descriptors 808 may be generated to provide focus only on user interaction 802 and not on the actor (real or virtual) who performs the user interaction 802. A vocabulary database 810 may provide vocabulary inputs to the LSTM network 804 in order to enable the LSTM network 804 to generate the descriptors 808 more accurately. For better classification of a user interaction 802, historical information may also be used. By way of an example, if the user interaction 802 is: "A virtual user taking a packet marked as salt and pouring it in a mixer jar," the descriptors 808 will be: "A virtual user poured salt," rather than "A user poured white powder." In other words, the historical information further enables generation of the descriptors 808 that are more accurate.

In order to generate a response to the user interaction 802, the descriptors 808 are fed into a parts of speech analyzer 812, which determines various parts of speech attributes associated with the descriptors 808. The parts of speech attributes may include verb, noun, pronoun, adverb, adjective, determiner, preposition, conjunction, or interjection. The parts of speech attributes enable determining objects and associated actions within the descriptors 808.

Once the parts of speech analyzer 812 identifies the parts of speech attributes, a user interaction detector 814 determines whether the user interaction 802 with one or more objects of interest 506 within the scene is predetermined (i.e., a user interaction 802 that does not alter a workflow associated with the scene) or undetermined (i.e., a user interaction 802 that alters the workflow associated with the scene). The user interaction 802 may be addressed by multiple agents that may be real or virtual agents. When the user interaction 802 does not lead to a change in the sequence of states within the workflow, a response may be provided through the agent (physical or virtual). By way of an example, a response to the user interaction 802 with a virtual device may include cautioning the user while he handles the virtual devices in a specific way. By way of another example, if the user interaction 802 includes a user query (for example, how long would it take to powder an item), a response may be provided to the user and this does not lead to a change in the workflow.

However, when the user interaction 802 leads to a change in the sequence of states within the workflow, response or actions may be performed by agents (real or virtual) that further alter the sequence of states within the workflow. By way of an example, a user may break a knob of a mixer while operating it. In such a scenario, contemporaneous to the user breaking the knob, a service engineer (virtual) may pop up instead of a chef, and may then repair the mixer within the VR environment. Once the repair is completed, the chef may take over from that point onwards. By way of another example, the user interaction 802 may include adding some items into a mixer jar and the items are required to be grounded. When the power to the mixer jar is switched on, the sequence of states in the workflow may be altered.

Based on detection of the user interaction 802 as predetermined or undetermined, the user interaction detector 814 may also generate a response 816 for the user interaction 802. The response 816 may either be a part of one of the sequence of states within the workflow or the response 816 may be generated in real time by a real agent. If the user interaction 802 captured at the penultimate layer of the deep learning extraction model or at output of the LSTM network 804 matches semantically with any predetermined interactions available in the pre-stored data repository 218, an associated (or mapped) predetermined response (which, for example, may be a visual action by a virtual agent or a voice response) is delivered to the user.

In an embodiment, the response 816 may invoke a dialog system, when the user interaction 802 includes asking a question or if the user interaction 802 requires a voice response that may be delivered through a virtual agent (for example, a chef, when a virtual user is operating a mixer grinder). Visual actions within the VR environment may also require a voice based response. By way of an example, if a user is turning a knob of a mixer tightly, a voice response instructing the user to be a little gentle may be generated.

When the user interaction detector 814 identifies the user interaction as undetermined, a request to generate the response 816 to the user interaction is routed to a physical or real agent. By way of an example, when there is no answer available for a user query, the user query is directed to a human expert, who may provide an answer to the user query. The answer or response may then be rendered to the user in the VR environment through an avatar of the human expert or through the same virtual agent that was supposed to provide an answer to the user in the VR environment. The method of rendering is further explained in detail in conjunction with FIG. 9.

Figure 9:
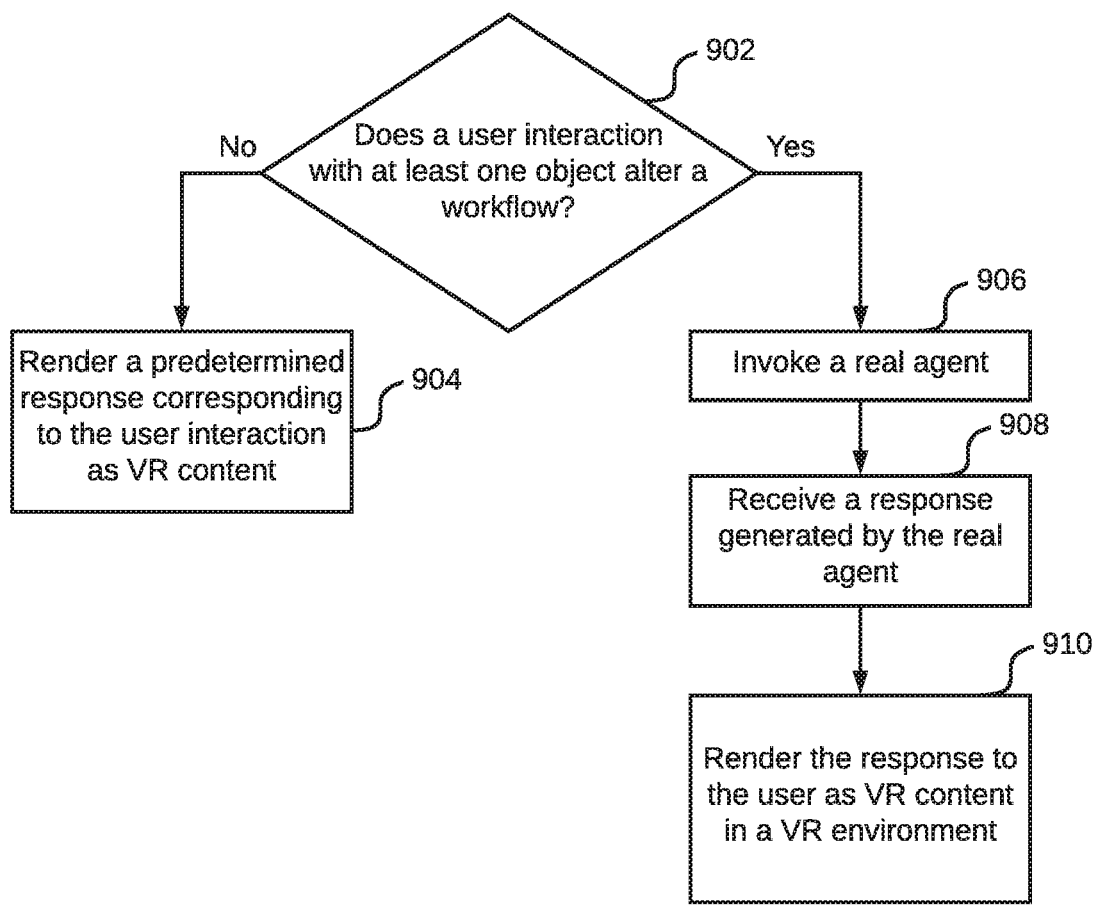
FIG. 9 illustrates a flowchart of a method for rendering a VR content within a VR environment in response to a user interaction, in accordance with an embodiment.

Referring now to FIG. 9, a flowchart of a method for rendering a VR content within a VR environment in response to a user interaction is illustrated, in accordance with an embodiment. At step 902, a check is performed to determine whether a user interaction with one or more objects of a scene within the VR environment alters a workflow associated with the scene. As discussed before, a workflow for a scene includes a sequence of states and each state in the sequence includes a predetermined interaction and a mapped predetermined response. Such mapping is stored within the pre-stored data repository 218. When the user interaction does not match with any predetermined interaction within the workflow, the user interaction alters the workflow. In other words, when a predetermined interaction matching with the user interaction is not available in the pre-stored data repository 218, the user interaction alters the workflow.

When the user interaction does not alter the workflow, a predetermined response that corresponds to the user interaction is rendered, at step 904, to the user within the VR environment. In other words, the user interaction matches a predetermined interaction in the pre-stored data repository 218. Thus, the predetermined response that is mapped to the predetermined interaction is rendered to the user. The predetermined response is provided through one of a physical agent and a virtual agent. The predetermined response is rendered as the VR content. This has been explained in detail in conjunction with FIG. 8.

Figure 10:
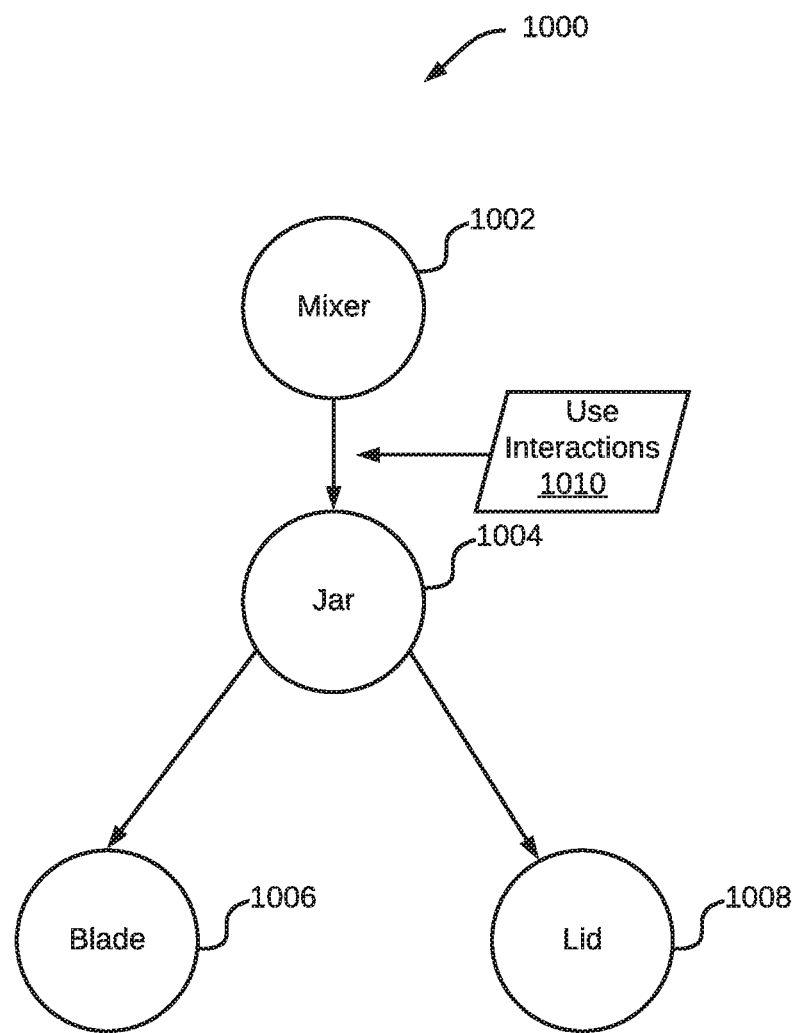
FIG. 10 illustrates a hierarchical tree depicting an order line for storing data related to VR objects, in accordance with an exemplary embodiment.

The VR content may include VR objects which may be stored in an order in which the VR objects are to be rendered to the user, considering provisioning for user interactions from the user or other actors (for example, a virtual chef operating the mixer grinder). FIG. 10 illustrates a hierarchical tree 1000 that depicts an order line for storing data for VR objects. A parent node 1002 in the hierarchical tree 1000 represents a mixer. The parent node 1002 includes a child node 1004 that represents a jar of the mixer. The child node 1004 further includes two nodes 1006 and 1008, which respectively represent a blade of the jar and a lid of the jar. Thus, when an actor (real or virtual) operates a mixer, the VR objects are rendered according to the stored order line as depicted by the hierarchical tree 1000. User interactions 1010 and corresponding response may be permitted at regular intervals as depicted in FIG. 10.

Referring back to step 902, when the user interaction alters the workflow, a real agent is invoked at step 906. The user interaction does not match with any predetermined interaction in the pre-stored data repository 218. Thus, a mapped predetermined response is not available in the pre-stored data repository 218. In other words, the user interaction does not match with any predetermined interaction within any state of the sequence of states, thus a corresponding predetermined response is not available. As a result, a real agent (for example, a human expert) is invoked to provide a response to the user interaction. At step 908, a response generated by the real agent is received. Thereafter, at step 910, the response is rendered to the user as the VR content in the VR environment. The VR content may be rendered through one or more of the real agent and a virtual agent.

Thus, when a response is not available in the pre-stored data repository 218 for a user query, a human expert is invoked and the user query is shared with the human expert. The human expert then provides a response to the query either with his own avatar in the VR environment or through a virtual agent that was supposed to provide the answer to the user query. By way of an example, a user may ask a virtual chef regarding power consumed by a mixer to grind. If the user query does not match with any predetermined user interaction within the pre-stored data repository 218, a human expert is invoked and provides a response. The response may be delivered through the virtual chef, thereby, making this transition transparent to the user.

The VR content rendered to the user may be partly predetermined and partly generated adaptively based on undetermined interactions in real time. A scene to be rendered to the user may be composed based on a sequence of operations selected adaptively based on user interaction as well as response provided to the user interactions from virtual agents or real agents.

Figure 11:
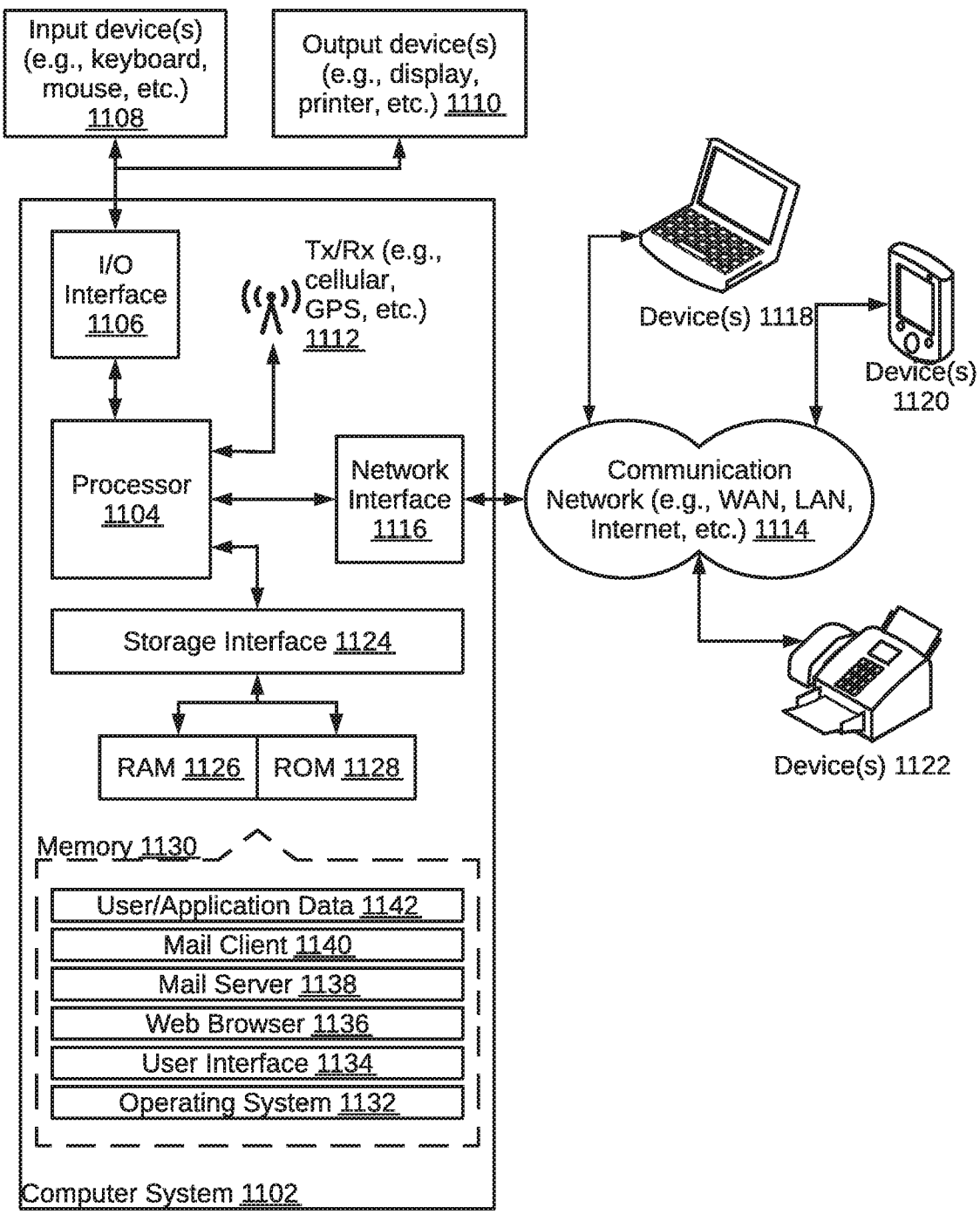
FIG. 11 illustrates a block diagram of an exemplary computer system for implementing various embodiments.

FIG. 11 is a block diagram of an exemplary computer system 1102 for implementing various embodiments. Computer system 1102 may include a central processing unit ("CPU" or "processor") 1104. Processor 1104 may include at least one data processor for executing program components for executing user- or system-generated requests. A user may include a person, a person using a device such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution 2(LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1110 may be a printer, fax machine, video display (e.g., cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (e.g., using Wireless Application Protocol), the Internet, etc. Using network interface 1116 and communication network 1114, computer system 1102 may communicate with devices 1118, 1120, and 1122. These devices 1118, 1120, and 1122 may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices 1118, 1120, and 1122.

In some embodiments, processor 1104 may be disposed in communication with one or more memory devices (e.g., RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (e.g., any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces 1134 may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 1136 may utilize facilities such as AJAX, DHTML, ADOBE® FLASH® platform, JAVASCRIPT® programming language, JAVA® programming language, application programming interfaces (APis), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide system and method for rendering VR content. The system and method are adapted to provide interactive, adaptive and dynamic VR contents in response to one or more user interactions that may include predetermined interactions and undetermined interactions. The VR system further provides real-time and contextual response to one or more user interactions. The system dynamically monitors user interactions, responses to the user interactions, and switchover between real and virtual agents while rendering the VR content to provide a user with seamless VR experience in real time.

The system includes one or more features that are configured to facilitate adaptive updating of a pre-stored data repository based on data derived from the response provided by a real-agent in response to an undetermined interaction. Thus, the system is configured to automatically scale-up the pre-stored data repository.

The system thus supports unanticipated user actions and overcomes VR content insufficiency in real time. The system further supports dynamic interaction with the user, based on a current context and provides seamless VR experience, even if a part of the VR experience is created on the fly in real time. The system also performs continuous learning, such that, the VR content is updated for subsequent use when similar scenarios may reoccur. Moreover, the system supports adaptive updating of VR content at right place, such that, the updated content fits into a workflow.

The specification has described system and method for rendering VR content. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of rendering Virtual Reality (VR) content, the method comprising:

identifying, by a rendering device, a user interaction with at least one object within a VR environment;

training, by the rendering device, a deep learning feature extraction model to identify predetermined and undetermined interactions in the VR environment, wherein the deep learning feature extraction model is trained based on a plurality of scene images and associated applied templates that are provided to the deep learning feature extraction model, wherein each of the applied templates identifies at least one spurious object and at least one object of interest in an associated scene image from the plurality of scene images;

classifying, by the rendering device, the user interaction as one of a predetermined interaction and an undetermined interaction based on the deep learning feature extraction model; and rendering, by the rendering device, a VR content in response to the user interaction being classified as one of the predetermined interaction and the undetermined interaction.

2. The method of claim 1, wherein classifying comprises:
identifying the user interaction with the at least one object of interest in a scene within the VR environment;
providing the user interaction to the deep learning feature extraction model;
classifying, by the deep learning feature extraction model, the user interaction as predetermined, when the user interaction matches with one of workflow interactions within a workflow associated with the scene; and
classifying, by the deep learning feature extraction model, the user interaction as undetermined, when the user interaction does not match with one of the workflow interactions within the workflow.

3. The method of claim 2, wherein the workflow comprises a sequence of states, wherein each state in the sequence of states comprises a predetermined interaction and an associated predetermined response.

4. The method of claim 3, further comprising creating a pre-stored data repository, wherein for each state in the sequence of states, the pre-stored data repository comprises mapping of the predetermined interaction and the associated predetermined response.

5. The method of claim 1, wherein rendering comprises providing the predetermined response corresponding to the user interaction, when the user interaction does not alter the workflow, wherein the predetermined response is provided through one of a physical agent and a virtual agent, and wherein the predetermined response corresponds to the VR content.

6. The method of claim 5, wherein the predetermined response corresponding to the user interaction is retrieved from the pre-stored data repository.

7. The method of claim 5, wherein rendering comprises:
invoking a real agent, when the user interaction does not alter the workflow;
receiving a response generated by the real agent, based on the user interaction; and
providing the response to the user in the VR environment, through one or more of the real agent and a virtual agent, wherein the response corresponds to the VR content.

8. The method of claim 1, wherein training the deep learning feature extraction model further comprises:
inputting a scene image from the plurality of scene images and the associated applied template as data to the deep learning feature extraction model;
identifying at least one attribute associated with each of the at least one spurious object based on a Long Short Term Memory (LSTM) based caption generator, wherein an output from a penultimate layer of the deep learning feature extraction model is provided to the LSTM based caption generator; and
separating out the at least one object of interest and the at least one spurious object in the scene image, based on the at least one attribute identified for the at least one spurious object.

9. The method of claim 1, wherein the deep learning feature extraction model comprises one of a Convolutional Neural Network (CNN) and an auto-encoder.

10. The method of claim 1, further comprising monitoring, the user interaction through at least one modality comprising a camera, a microphone, and haptic gloves.

11. A system for rendering Virtual Reality (VR) content, the system comprising:
a processor; and
a memory communicatively coupled to the processor, wherein the memory stores processor instructions, which, on execution, causes the processor to:
identify a user interaction with at least one object within a VR environment;
train a deep learning feature extraction model to identify predetermined and undetermined interactions in the VR environment, wherein the deep learning feature extraction model is trained based on a plurality of scene images and associated applied templates that are provided to the deep learning feature extraction model, wherein each of the applied templates identifies at least one spurious object and at least one object of interest in an associated scene image from the plurality of scene images;
classify the user interaction as one of a predetermined interaction and an undetermined interaction based on the deep learning feature extraction model; and
render a VR content in response to the user interaction being classified as one of the predetermined interaction and the undetermined interaction.

12. The system of claim 11, wherein classifying comprises:
identifying the user interaction with the at least one object of interest in a scene within the VR environment;
providing the user interaction to the deep learning feature extraction model;
classifying, by the deep learning feature extraction model, the user interaction as predetermined, when the user interaction matches with one of workflow interactions within a workflow associated with the scene; and
classifying, by the deep learning feature extraction model, the user interaction as undetermined, when the user interaction does not match with one of the workflow interactions within the workflow.

13. The system of claim 12, wherein the workflow comprises a sequence of states, wherein each state in the sequence of states comprises a predetermined interaction and an associated predetermined response.

14. The system of claim 13, further comprising creating a pre-stored data repository, wherein for each state in the sequence of states, the pre-stored data repository comprises mapping of the predetermined interaction and the associated predetermined response.

15. The system of claim 11, wherein rendering comprises providing the predetermined response corresponding to the user interaction, when the user interaction does not alter the workflow, wherein the predetermined response is provided through one of a physical agent and a virtual agent, and wherein the predetermined response corresponds to the VR content.

16. The system of claim 15, wherein the predetermined response corresponding to the user interaction is retrieved from the pre-stored data repository.

17. The system of claim 15, wherein rendering comprises:
invoking a real agent, when the user interaction does not alter the workflow;
receiving a response generated by the real agent, based on the user interaction; and
providing the response to the user in the VR environment, through one or more of the real agent and a virtual agent, wherein the response corresponds to the VR content.

18. The system of claim 11, wherein training the deep learning feature extraction model further comprises:
inputting a scene image from the plurality of scene images and the associated applied template as data to the deep learning feature extraction model;
identifying at least one attribute associated with each of the at least one spurious object based on a Long Short Term Memory (LSTM) based caption generator, wherein an output from a penultimate layer of the deep learning feature extraction model is provided to the LSTM based caption generator; and
separating out the at least one object of interest and the at least one spurious object in the scene image, based on the at least one attribute identified for the at least one spurious object.

19. The system of claim 11, further comprising monitoring, the user interaction through at least one modality comprising a camera, a microphone, and haptic gloves.

20. A non-transitory computer-readable storage medium having stored thereon, a set of computer-executable instructions causing a computer comprising one or more processors to perform steps comprising:
identifying a user interaction with at least one object within a Virtual Reality (VR) environment;
training a deep learning feature extraction model to identify predetermined and undetermined interactions in the VR environment, wherein the deep learning feature extraction model is trained based on a plurality of scene images and associated applied templates that are provided to the deep learning feature extraction model, wherein each of the applied templates identifies at least one spurious object and at least one object of interest in an associated scene image from the plurality of scene images;
classifying the user interaction as one of a predetermined interaction and an undetermined interaction based on the deep learning feature extraction model; and
rendering a VR content in response to the user interaction being classified as one of the predetermined interaction and the undetermined interaction.

* * * * *